July 7, 1959  H. F. CROTTY ET AL  2,894,146
IMPULSE GENERATING DEVICE
Filed May 26, 1955  2 Sheets-Sheet 1

Inventors:
Harold F. Crotty
John F. Scamman
by, Richard E. Hosley
Their Attorney July 7, 1959

H. F. CROTTY ET AL 2,894,146

IMPULSE GENERATING DEVICE

Filed May 26, 1955

Inventors:
Harold F. Crotty
John F. Scamman
by, Richard E. Harley
Their Attorney

United States Patent Office 2,894,146
Patented July 7, 1959

2,894,146

IMPULSE GENERATING DEVICE

Harold F. Crotty, Dover, and John F. Scamman, Somersworth, N.H., assignors to General Electric Company, a corporation of New York Application May 26, 1955, Serial No. 511,211

2 Claims. (Cl. 250—231)

This invention relates generally to an impulse generating device and in particular relates to a compact arrangement of such a device, operating on the photo-electric principle, and adaptable for use in connection with a watthour demand meter system.

In the art of watthour demand metering, it has been customary in the past to rely upon the use of mechanically operated contact devices to generate the electric impulses used in measuring demand. These contact devices have been found to be satisfactory for most applications but in the case of a system having a high demand rate, the use of mechanical devices imposes substantially increased loads on the watthour meter resulting from the increased friction and inertia forces encountered during any periods of high rate action. Moreover with a rapidly operating contact device, the problem of contact wear is always a troublesome one, and in view of these aforementioned difficulties, it has been found that contact devices cannot be used as effectively with high rate demand systems as with systems having lower demand rates.

It is therefore an object of this invention to provide an impulse generating device intended to replace the mechanical contact device heretofore used and adapted to generate impulses at a much higher rate in a more efficient manner.

It is another object of the invention to provide a compact arrangement of parts for the improved impulse generating device whereby manufacturing costs may be significantly reduced and field servicing substantially simplified. It is yet another object of the invention to provide an impulse generating device operating on the photo-electric principle and adapted to produce two independent impulses for each rotation of a shutter member that is operatively coupled to the output shaft of a watthour meter.

Briefly stated, the invention comprises the use of a compact supporting cage that is readily adapted for mounting on a watthour meter and includes a twin photo cell assembly and a twin lamp assembly mounted within the cage in close proximity to each other but separated by a rotatably mounted shutter driven by the watthour meter and an aperture to permit selective illumination of each cell in response to operation of the watthour meter. All of the parts are compactly arranged and mounted within the cage, with both the photo cell assembly and lamp assembly easily accessible for replacement of defective units. A suitable set of intermediate gears is also carried by the cage and is adapted to be transposed between the shutter and the driving shaft of the watthour meter. The gear ratio of this intermediate set of gears can be altered conveniently to provide a considerable degree of flexibility in the adaptation of the device to any particular demand system.

The objects of the invention, together with the benefits and advantages to be derived therefrom, will be more readily understood upon reference to the detailed specification found below and in conjunction with the drawings annexed hereto in which.

Figure 1:
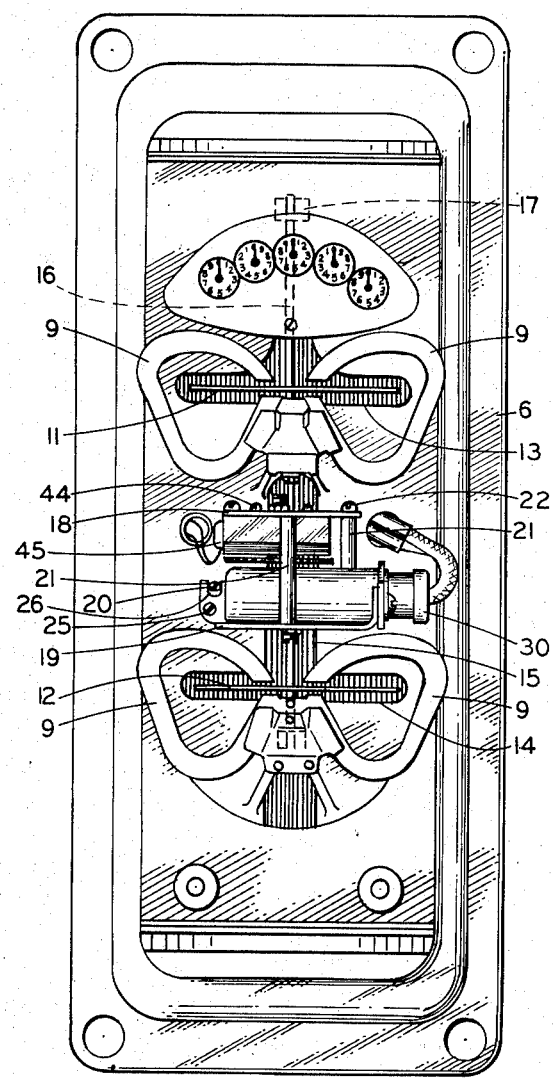
Figure 1 is a view in elevation showing the improved impulse generating device as it is mounted on a two-element watthour meter.

Referring first to Figure 1, it is seen that a two-element watthour meter has been selected to illustrate the impulse generating device combined with a watthour meter and since the two-element watthour meter shown is a conventional form of meter well known and understood by those skilled in the art, little will be said of this part of the complete device shown in Figure 1 aside from the few brief statements to follow.

Figure 2:
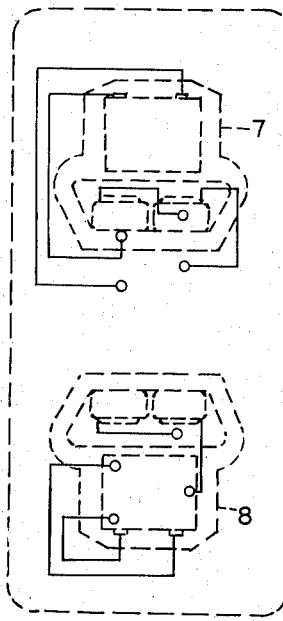
Figure 2 is a simplified schematic view of the watthour meter structure showing how the watthour meter elements are arranged in the complete device.

Thus, the watthour meter includes a main supporting frame 6 which may be in the form of a casting which in the illustrated embodiment happens to be made of aluminum. The working parts of the watthour meter are mounted on the reverse side of this casting and they are shown somewhat schematically at 7 and 8 in Figure 2.

Mounted on the outer face of the casting 6 are a plurality of conventional C-shaped damping magnets 9 intended to cooperate with the watthour meter disks 11 and 12 in a well known manner. Suitable recesses 13, 14 are provided in a frame 6 to accommodate the disks and both of these recesses open into a recess 15 extending vertically therebetween and disposed substantially in the center portion of frame 6. Conventional jewel bearings may be used to journal the shaft 16, one of which is shown schematically at 17.

So far the arrangement described is quite conventional and it is to be noted that the overall assembly of the double element watthour meter is a compact one, leaving little room for any impulse generating device intended to be used therewith.

Figure 4:
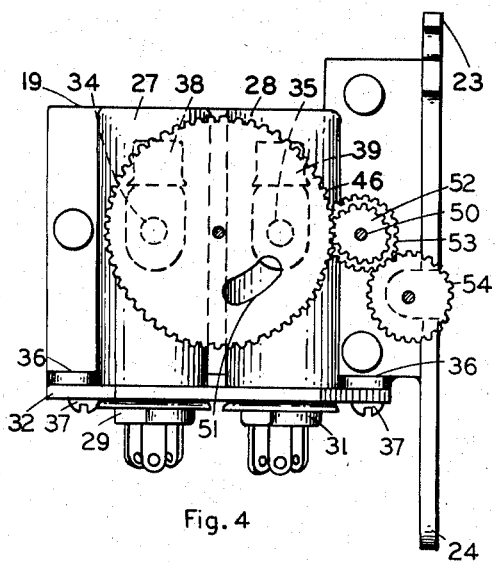
Figure 4 is a plan view of the device with the upper portion thereof removed to illustrate the arrangement of the twin photo cell assembly, the shutter, intermediate gears and the watthour meter shaft and its associated driving gear.
Figure 5:
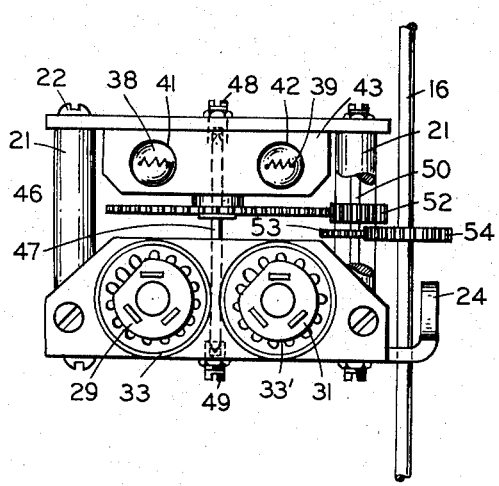
Figure 5 is an end view of the complete impulse generating device.

Referring now to Figures 1, 4 and 5, it is seen that the impulse generating device includes a compact supporting cage consisting of the upper and lower plates 18, 19 suitably held together and spaced apart by means of a plurality of identical spacer members 21. The members 21 may be in the form of rods having their lower extremities projecting through suitable cooperating apertures provided in lower plate 19 and staked thereto. The upper extremities of these spacers may be provided with suitably threaded bores for a portion of their length to accommodate a plurality of fastening screws 22. In this way the two plates, together with the spacer members, can be formed into a compact cage assembly which for all practical purposes may be regarded as an integral unit. The rear edge of lower plate 19 may be turned up at right angles thereto and formed with the mounting ears 23, 24, extending outwardly from opposite sides of the main body of the plate. These ears may be provided with suitable elongated slots intended to overlie a pair of suitably threaded apertures in the casting 6. A screw may then be inserted through each of the elongated slots and into the threaded apertures provided in the frame 6 so that the cage can be securely mounted on the frame. One of the screws is shown at 25 and immediately above this screw there is a U-shaped slot 26 provided in ear 23 for a purpose to be described in greater detail below.

Referring now to Figures 4 and 5 in addition to Figure 1, it is seen that a twin photo cell assembly is removably mounted to the lower plate 19 and a twin lamp assembly is mounted on upper plate 18. The photo cell assembly comprises the individual photo cells 27, 28 provided with cylindrical outer housings and having their respective base members in the form of conventional three-pronged molded plugs 29, 31 extending through a pair of suitable apertures provided in a base plate 32. Surrounding the plugs on the outer side of the plate 32 are identical lock washers 33 both of which are provided with a plurality of resilient tongues 33' intended to aid in holding the photo cells in place on the plate 32. The cylindrical housings are each provided with an aperture 34, 35 under which is mounted the light responsive portion of the cell. Connections from the cell to an external circuit may be made by suitable internal wiring connecting the cells to the prongs, which in turn may have suitable plugs 30 and leads connected thereto as shown in Figure 1.

The plate 32 is provided with a pair of apertures at its opposite ends opposite a pair of up-turned ears 36 formed along one edge of plate 19. These ears have suitably threaded apertures to receive the fastening screws 37 whereby the photo cell assembly can be securely held in place. Upon removal of the screws, the entire photo assembly can be removed from the supporting cage and replaced with a new one if it is so desired.

The twin lamp assembly includes a pair of lamps 38, 39 mounted within a pair of parallel circular slots 41, 42 extending completely through a supporting housing 43 adapted to be securely mounted on the under side of plate 18 by means of a plurality of suitable screws 44. The base of the lamps cooperate with conventional plugs extending outwardly from one end of the parallel slots and the two plugs may have affixed thereto suitable leads from a lamp energizing source. The protruding portion of one of these base members is shown at 45 in Figure 1 together with its associated lead wires. The housing 43 is provided with a pair of apertures underlying the lamps and extending transversely from the slots 41, 42 through the lower surface of the housing and aligned with the apertures 34, 35. This permits light to pass from within the slots downwardly, to illuminate the areas of the photo cells exposed by the apertures 34, 35.

Disposed between the housing 43 and the photo cells is a shutter in the form of a light-weight aluminum disk 46. The disk is suitably mounted on a shaft 47 having its upper and lower extremities journaled for rotation in the plates 18, 19 by means of conventional bearings 48, 49 mounted respectively thereon. The periphery of disk 47 is provided with a series of gear teeth and an elongated arcuate slot 51 is provided in one portion of the disk. The shutter is thus in the form of a thin gear mounted for rotation and driven by a gear 52 meshing therewith. Gear 52 is part of a gear drive unit which includes a shaft 50 suitably journaled for rotation in the plates 18, 19 and on which is also mounted a gear 53 intended to mesh with gear 54 affixed to the watthour meter shaft 16.

Rotation of the shaft 16 will operate to rotate the shutter 46 through the intermediate gears 52, 53. Since the gears 52, 53 are independent of the matthour meter, it is immediately apparent that different combinations of gears could be used for the intermediate gear drive to obtain different speed ratios between the shutter and the watthour meter shaft. The journaling arrangements for the gear drive unit can be easily removed for any necessary substitution or replacement.

To provide for proper mesh between the gears 53, 54 the U-shaped slot 26 has been provided to cooperate with a screw of eccentric configuration 20 mounted on the watthour meter frame 6. When the cage assembly is completed and affixed to frame 6, the fastening screws 25 are not tightened securely in place but they are drawn up tight enough to position the cage assembly in place on the frame 6. If the gears 53, 54 do not properly mesh, then the eccentric screw 20 lying within the U-shaped slot 26 can be rotated in either direction to obtain mesh of the gears.

Rotation of the eccentric screw causes the entire cage assembly to be shifted slightly to the right or the left of frame 6 to accomplish the necessary fitting of the parts. After this has been done, the screws 25 are then tightened securely so that the cage assembly is securely affixed to the watthour meter frame.

Figure 3:
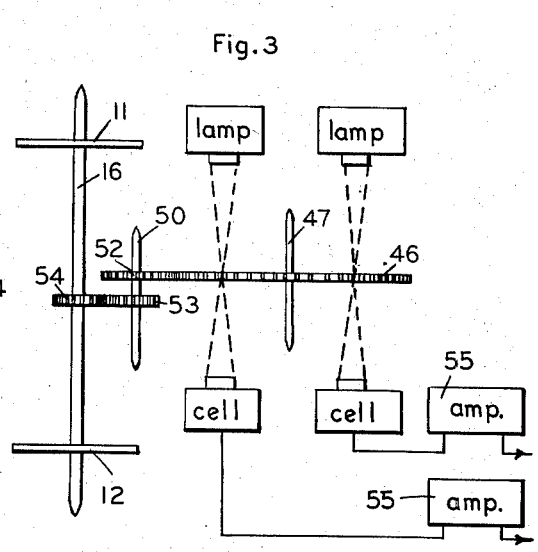
Figure 3 is a combined electrical and mechanical schematic diagram illustrating the operation of the device.

With the above arrangement of parts in mind and upon reference to Figure 3, it is to be noted that light coming from the lamps passes downwardly to illuminate the exposed surfaces of the photo cells. However, the light beams coming from the two lamps are blocked by the shutter 46, except when the slot 51 is in line with the beam. Such a position of the shutter permits the beam to pass to its corresponding cell and generate a pulse which can then be fed to a suitable amplifier, there being one for each cell as shown generally at 55 in Figure 3. These amplifiers may be connected to any suitable pulse actuated mechanism for the purpose of indicating or recording the number of pulses being generated in any predetermined demand interval.

It is thus apparent that as the shaft of the watthour meter rotates, it causes the slot 51 in the shutter to sequentially align itself with corresponding pairs of lamps and photo cells. For each revolution of the shutter 46, two pulses are generated and amplified and transmitted to the end device of the system.

From the above, it is seen that a very compact impulse generating device is provided by the invention and with the use of light-weight material for the gears 52, 53, 54 and the shutter 46, it is apparent that little loading is imposed on the watthour meter. Moreover with a suitable selection of end devices adapted to respond immediately to an incoming pulse from one cell and then shut themselves off to await a pulse from the other cell, it is apparent that the twin arrangements of lamps and photo cells operates to prevent any pulses being transmitted to the end device merely upon oscillation of the watthour meter about one photo cell. In other words, with the end device responsive only to pulses delivered thereto from the individual photo cell networks, the shutter 46 must rotate to operate the end device.

Moreover the use of an electrical network provides for much greater flexibility in the system because such a network can normally handle pulses at a much higher rate than the conventional mechanical contact devices heretofore used to generate impulses in a demand metering system.

In addition, the complete device is made up of a combination of relatively simple parts that are well adapted to low cost manufacturing techniques, and the arrangement of the parts in the complete assembly facilitates simplified and economical manufacturing techniques. Also, the various parts are quite accessible for the purpose of adjustment or repair and the problem of replacement of lamps or photo cells is quite easily handled in the field.

All in all, a very compact impulse generating device is provided, one that is conveniently and easily adapted to a watthour meter and capable of generating pulses at a high rate without embodying any significant loading on the watthour meter. Economy of manufacturing and ease of servicing are important features of the device, as well as the overall simplicity of the complete arrangement.

Therefore, while a particular embodiment of the subject invention has been shown and described herein, it is in the nature of description rather than limitation, and it will occur to those skilled in the art that various changes, modifications, and combinations may be made within the province of the appended claims, and without departing either in spirit or scope from this invention in its broader aspects.

What we claim as new and desire to secure by Letters Patent of the United States is:

1. An impulse generating device for a watthour meter comprising a compact cage assembly which includes, in combination: a pair of flat spaced supporting plates which are secured together and removably mounted on the frame of an associated watthour meter; a lightweight opaque shutter in the form of a disc which is rotatably mounted between said support plates, said disc having an elongated arcuate slot therein; a pair of photocells mounted on one side of the disc, said photocells being diametrically disposed on opposite sides of and at equal radial distances from the axis of rotation of the disc, said photocells being mounted on a common base plate which is removably mounted on one of the support plates; a pair of lamps mounted on the other side of the disc, said lamps being mounted in a common housing which is secured to the other of said support plates, said lamps being positioned within said housing so that each lamp is opposite a corresponding photocell, said housing having a pair of apertures therein through which respective light beams are directed from the lamps to their corresponding photocells; said disc intercepting said light beams except when said arcuate slot lies in their path; and rotatably mounted gear means adapted to be driven by an associated watthour meter removably mounted between said support plates for driving said disc whereby said arcuate slot sequentially traverses said light beams, said cells being adapted for connection into electrical circuits from which may be derived electrical impulses each time the slot traverses a light beam.

2. The combination defined by claim 1 in which the associated watthour meter has a rotatably mounted shaft on which is mounted a gear which directly drives said gear means, said cage assembly being adjustably mounted on the watthour meter frame to permit proper meshing between the shaft gear and the gear means.

References Cited in the file of this patent

UNITED STATES PATENTS

| | | |
|---|---|---|
| 1,618,242 | Thompson | Feb. 22, 1927 |
| 1,857,593 | Hill | May 10, 1932 |
| 1,886,188 | Hough | Nov. 1, 1932 |
| 2,176,442 | Wise | Oct. 17, 1939 |
| 2,263,228 | Wolff et al. | Nov. 18, 1941 |
| 2,364,147 | Jones | Dec. 5, 1944 |
| 2,411,147 | Cooley | Nov. 19, 1946 |
| 2,451,971 | Oman | Oct. 19, 1948 |
| 2,490,234 | Shannon | Dec. 6, 1949 |
| 2,525,147 | Nelson | Oct. 10, 1950 |
| 2,537,427 | Seid et al. | Jan. 9, 1951 |
| 2,604,528 | Obermaier | July 22, 1952 |
| 2,669,310 | Haskins | Feb. 16, 1954 |